United States Patent
Wong et al.

[11] Patent Number: 5,953,347
[45] Date of Patent: Sep. 14, 1999

[54] INTEGRATED MANAGEMENT OF MULTIPLE NETWORKS WITH DIFFERENT TOPOLOGIES

[75] Inventors: Norman Wong, Kanata; Doug Bellinger, Ottawa; Russ Freen; Vish Raju, both of Kanata; Wade Neville, Almonte, all of Canada

[73] Assignees: CrossKeys Systems Corporation; Newbridge Networks Corporation, both of Kanata, Canada

[21] Appl. No.: 08/809,324
[22] PCT Filed: Sep. 19, 1995
[86] PCT No.: PCT/CA95/00522
    § 371 Date: May 2, 1997
    § 102(e) Date: May 2, 1997
[87] PCT Pub. No.: WO96/09707
    PCT Pub. Date: Mar. 28, 1996

[30] Foreign Application Priority Data
Sep. 19, 1994 [CA] Canada .................................. 2132363

[51] Int. Cl.⁶ .................................................. H04L 12/24
[52] U.S. Cl. .......................... 370/469; 370/401; 370/216
[58] Field of Search ..................................... 370/216, 242, 370/243, 244, 245, 246, 252, 254, 400, 401, 402, 403, 404, 405, 408, 465, 469; 395/200.53, 200.54, 200.55, 200.56; 379/219, 220, 221; 340/827, 825.06

[56] References Cited

U.S. PATENT DOCUMENTS

| | | | |
|---|---|---|---|
| 5,031,211 | 7/1991 | Nagai et al. | 379/221 |
| 5,491,693 | 2/1996 | Britton et al. | 370/401 |
| 5,651,006 | 7/1997 | Fujino et al. | 370/408 |
| 5,706,276 | 1/1998 | Arslan et al. | 370/216 |
| 5,758,083 | 5/1998 | Singh et al. | 370/254 |

OTHER PUBLICATIONS

Management Capabilities Of Transport Networks Based On The Synchronous Digital Ieriarchy (SDH) International Telecommunication Union G.831 (Mar. 1993) Digital Networks ITU–T Recommendation G.831.

Architechtures Of Transport Neetworks Based On The Synchronous Digital Hierarchy (SDH) International Telecommunications Union G.803 ITU–T Recommendation G.803 Mar. 1993 Digital Networks.

Principles for a Telecommunications Management Network International Telecommunications Management Networks CCITT The International Telegraph and Telephone Consultative Committee M.3010 Oct 1992.

*Primary Examiner*—Chi H. Pham
*Assistant Examiner*—Ricky Q. Ngo
*Attorney, Agent, or Firm*—Marks & Clerk

[57] ABSTRACT

An integrated network management system for multiple networks of different topology domains employs hierarchical pass-through routing and multi-network service management through the network.

10 Claims, 10 Drawing Sheets

INTEGRATED MANAGEMENT OF MULTIPLE NETWORKS WITH DIFFERENT TOPOLOGIES

This invention relates to the integrated management of multiple networks of different topologies, and in particular through hierarchical pass-through routing and multi-network service management.

Newbridge Networks Corporation's 4602/46020 MainStreet® Intelligent NetworkStation provides fully integrated network management of Newbridge's LAN, 36xx Time Division Multiplexing (TDM), Frame Relay, and Asynchronous Transfer Mode (ATM) products, with a rich Graphical User Interface (GUI) showing network topology and network element drawings, real-time status monitoring and fault management, and full path (service) management and service recovery capabilities.

In many networks however, the network is not a homogeneous Newbridge network. Here, the Newbridge network is overlayed onto a backbone network, which is typically composed of non-Newbridge higher order bandwidth equipment. Without integrated management of the backbone network(s), the operators of the network (typically telcos) cannot efficiently manage the entire network and service recovery around backbone network failures requires manual human intervention. Turnaround times to recover from network failures may be very long.

Accordingly the present invention provides an integrated network management system for multiple networks of different topologies having a hierarchy of different order bandwidth domains comprising at least one network manager, characterized in that said network manager manages the multiple networks and establishes links within a topology domain by implementing hierarchical pass-through routing within a higher order domain in the hierarchy and initiates recovery actions in the event of service failure starting at a domain with the highest order bandwidth.

Integrated network management of multiple networks of different topologies using Hierarchical Pass-Through Routing and Multi-Network Service Management provides a much more efficient means of management and service recovery.

Thus in accordance with the invention hierarchical Pass-Through Routing and Multi-Network Service Management are combined to provide integrated management of multiple network of different topologies with a rich Graphical User Interface (GUI) showing network topology and network element drawings, real-time status monitoring and fault management, and full path (service) management and service recovery capabilities.

The invention also provides a method of managing multiple networks of different topologies having a hierarchy of different order bandwidth domains with at least one network manager, characterized in that links within a topology domain are established by implementing hierarchical pass-through routing within a higher order domain in the hierarchy and that in the event of service failure, recovery action is initiated in a hierarchical manner starting from a domain with the highest order bandwidth.

BRIEF DESCRIPTION OF THE DRAWINGS

The invention will now be described in more detail, by way of example only, with reference to the accompanying drawings, in which.

Hierarchical Pass-Through can be used to integrate the management of 3/3, 3/1, and 1/0 Digital Cross-Connect Switches (DCS) with Newbridge products from Newbridge's 46020 network management system. A 3/3 digital cross-connect switch (DCS) terminates interfaces and switches at the DS3 level, a 3/1 DCS terminates interfaces and switches at the DS1 level, while a 3/1/0 DCS terminates interfaces and switches at the DS0 level, a DS0 link being at 64 kbits/sec, a DS1 link being at 1.544 Mb/sec, and a DS3 link being at 44.736 Mbits/sec, as is well known in the art.

Examples of non-Newbridge DCSs that may be managed by the 46020 include.

Tadiran's T::DAX and T::DAX100 (3/1)

AT&T's DACS II (1/0)

DSC's DEX CS1L (1/0)

AT&T's DACS III (3/3), and DACS IV (3/1)

Alcatel's 1631SX (3/1) and 1633SX (3/3)

Figure 1:
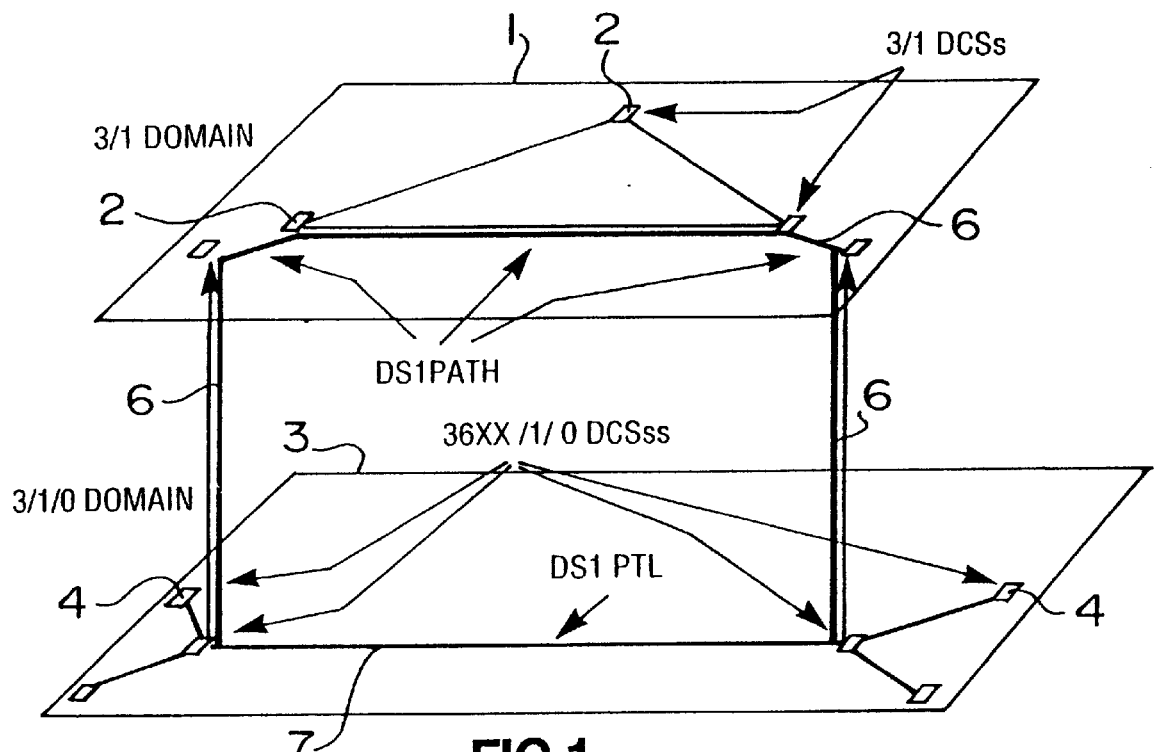
FIG. 1 shows 3/1 and 3/1/0 domain networks.
Figure 2:
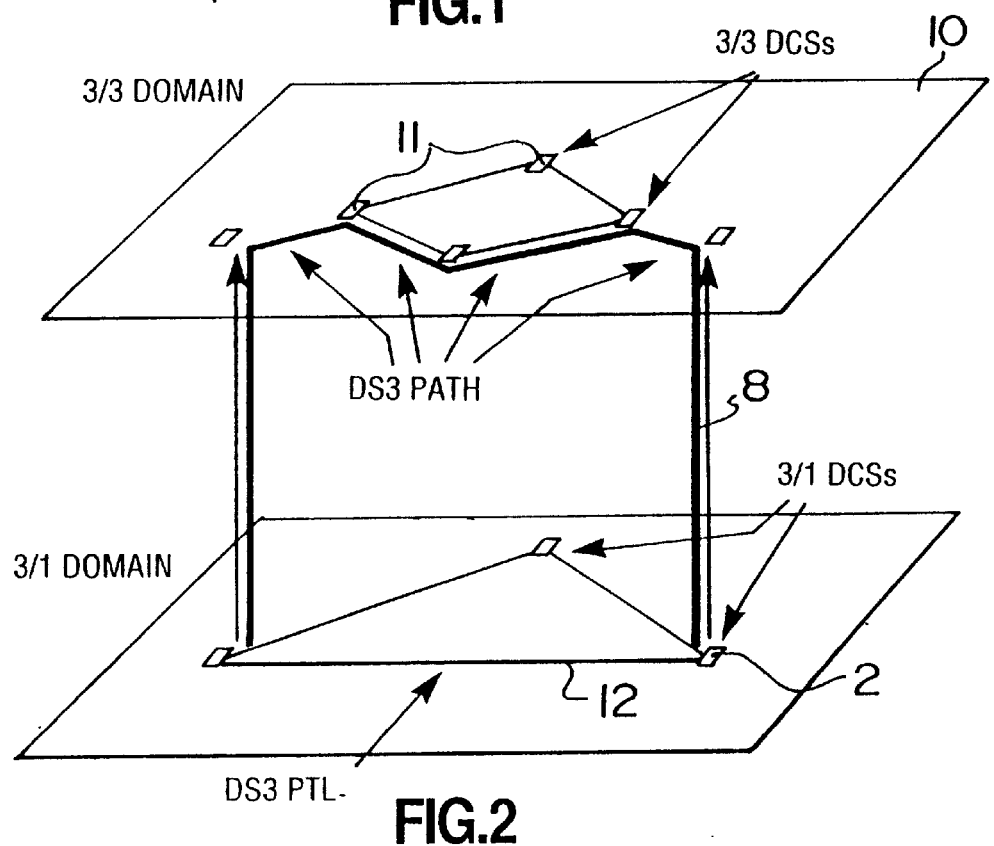
FIG. 2 shows 3/3 and 3/1 domain networks.

Referring now to FIG. 1, this shows a 3/1 domain 1 having a plurality of 3/1 digital cross connects switches (DCs) 2, and a 3/1/0 domain 3 of 3/1/0 Dcs 4, which are Newbridge Networks Corp. 36XX equipment for example, Mainstreet® 3600 bandwidth managers.

The network is managed by Newbridge Networks Corp. 46020 Mainstreet® network manager running on, for example, a Sun workstation, as will be described in more detail below.

In the 3/1/0 domain 3, the DS1 links between DCs are in many cases, DS1 paths 6 routed through another domain 1, which is, for example, an inter-office network. These links are considered Pass-Through Links (PTL), which appear as DS1 cables 7 in the 3/1/0 domain view and as DS1 paths 6 in the 3/1 domain view.

The integrated management of both the 3/1/0 and 3/1 networks from the 46020 network manager provides for optimized fault management and service recovery in the above system. In the event of a failure of DS1 PTL 7, recovery actions are first taken in the 3/1 network 1, i.e. by rerouting the DS1 path. If the DS1 PTL 7 cannot be rerouted, then recovery actions are taken in the 3/1/0 network, i.e. by rerouting the DS0 paths riding the DS PTL. Without integrated management of the 3/1/0 and 3/1 networks, failures in the 3/1 backbone network 1 might not be detected by the network management system for the 3/1/0 network 3.

In a 3/1 network of 3/1 DCSs (such as Tadiran's T..DAX, AT&T's DACS IV and Alcatel's 1631 SX), as shown in FIG.

2, the DS3 links are typically DS3 paths 8 routed through a "backbone" 10 of 3/3 equipment including 3/3 DCs 11. These links are considered Pass-Through Links, which appear as DS3 cables 12 in the 3/1 domain view and as the DS3 paths 8 in the 3/3 domain view.

The integrated management of the both the 3/1 and 3/3 networks from the 46020 provides for optimized service recovery. In the event of a DS3 PTL failure, recovery actions are first taken in the 3/3 network (DS3 path 8 is rerouted). If the DS3 path cannot be rerouted, then recovery actions are taken in the 3/1 network (DS1 paths riding the DS PTL are rerouted).

Figure 3:
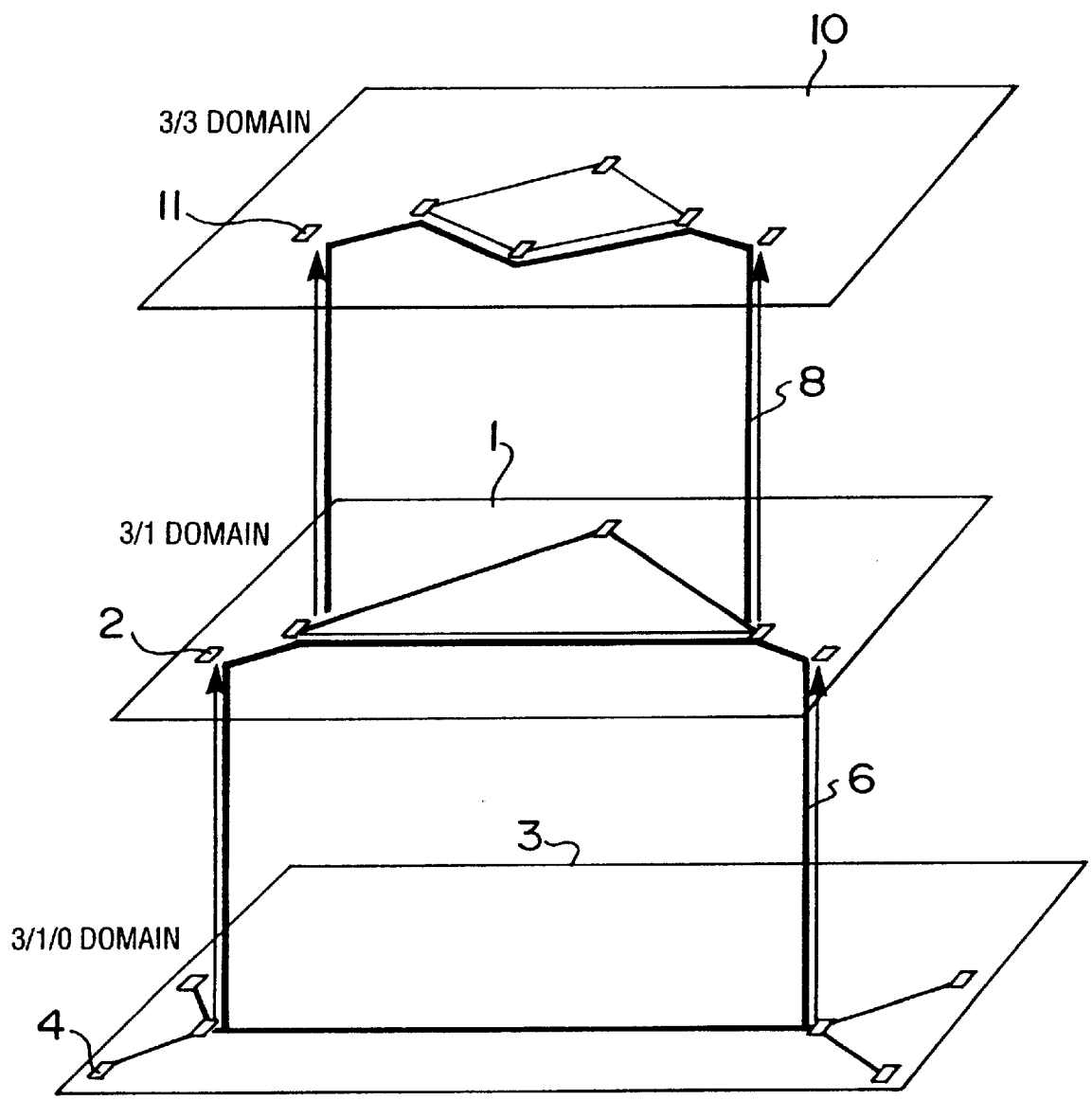
FIG. 3 shows 3/3, 3/1, and 3/1/0 domain networks.

These technology domain planes allow the 46020 network manager to view and manage 3/1/0, 3/1, and 3/3 networks as distinct and separate networks, while at the same time, providing integration of these domains (see FIG. 3). This hierarchical management provides for the most efficient service recovery, with recovery actions starting at the highest-order bandwidth domain.

Figure 4:
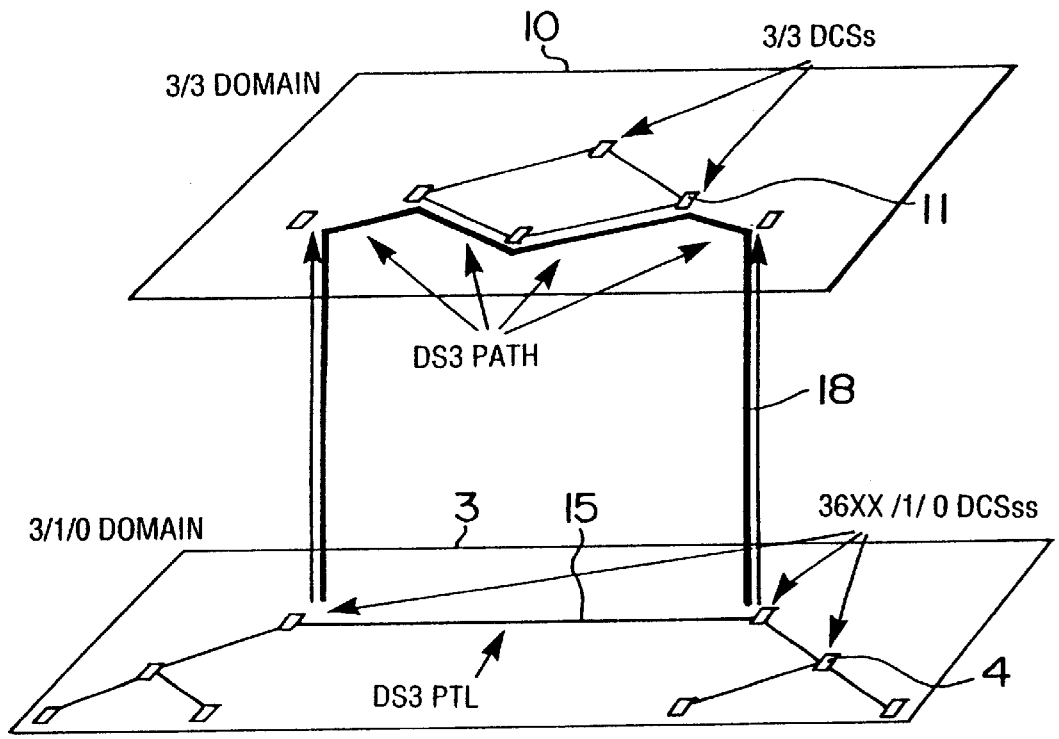
FIG. 4 shows 3/3 and 3/1 domain networks.

The 3/1/0 domain 3 may have a DS3 link that is a DS3 path 18 switched in the 3/3 domain, thereby bypassing the 3/1 network. This arrangement is illustrated in FIG. 4.

Figure 5:
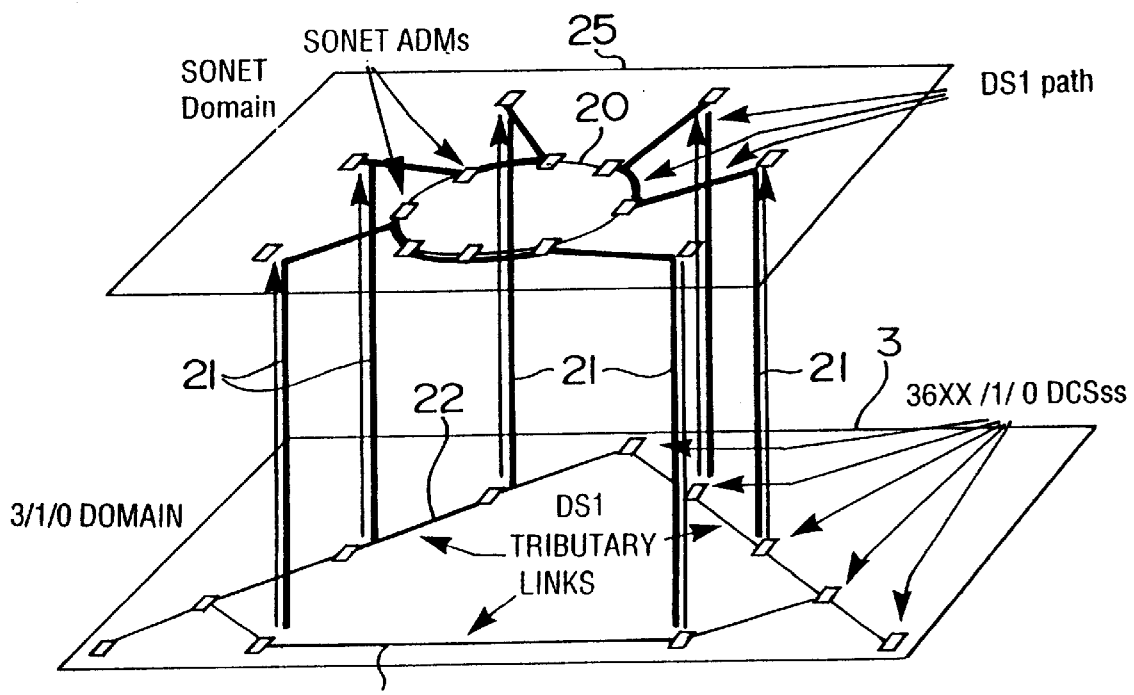
FIG. 5 shows SONET and 3/1/0 domain networks.

The concept of Hierarchical Pass-Through Routing can also be extended to provide integrated management of SONET ADM equipment. This is shown in FIG. 5, where a SONET ring 20 in SONET domain 25 provides DS1 transport for a 3/1/0 domain 3. In FIG. 5, DS1 paths 21 provide the DS1 links for the 3/1/0 domain 3.

This Hierarchical Pass-Through Routing management of SONET ADM equipment can also be used where a SONET ring provides DS1/DS3/OC-n transport for the ATM technology domain.

Figure 6:
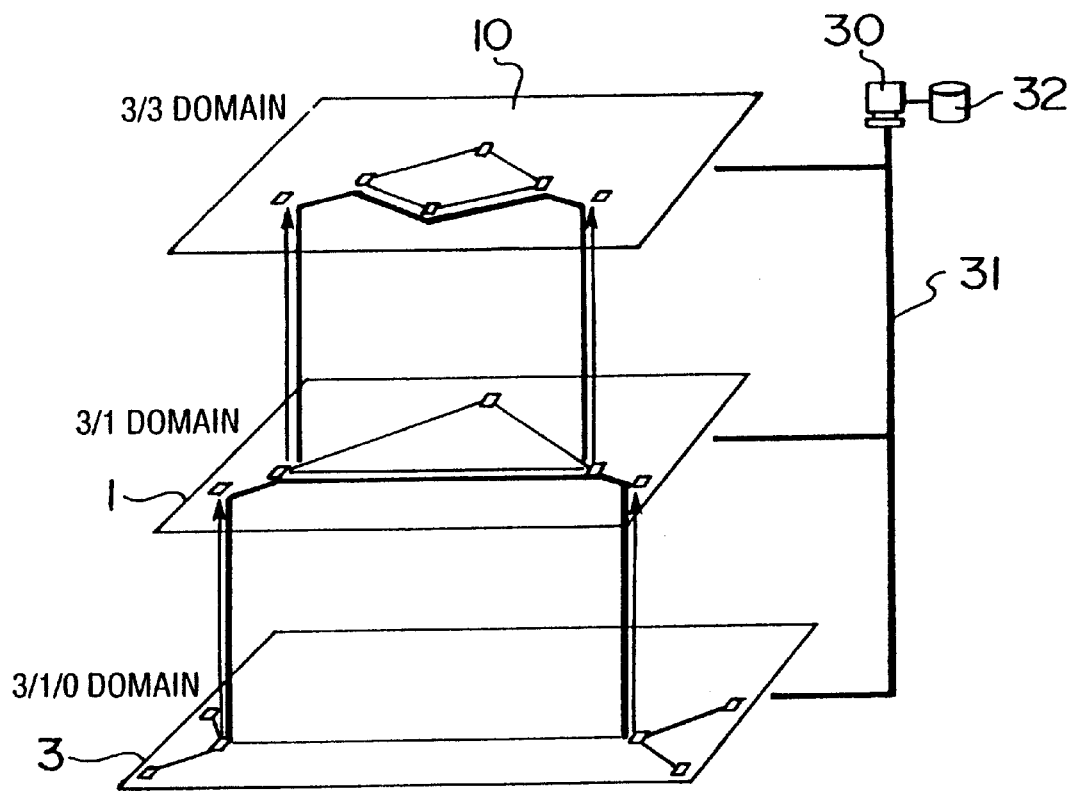
FIG. 6 shows Hierarchical Management applied to the Newbridge 46020 network management system.

The integrated management of different technology domains can be accomplished through the same 46020 which is managing the Newbridge network elements (see FIG. 6). In this mode, the different domain networks 1, 3, 10 can be represented as separate views on a graphical user interface (GUI). The domains are managed by a 46020 network manager, for example, running on Sun workstation 30 connected to the domains via links 31 and associated with database 32.

Figure 7:
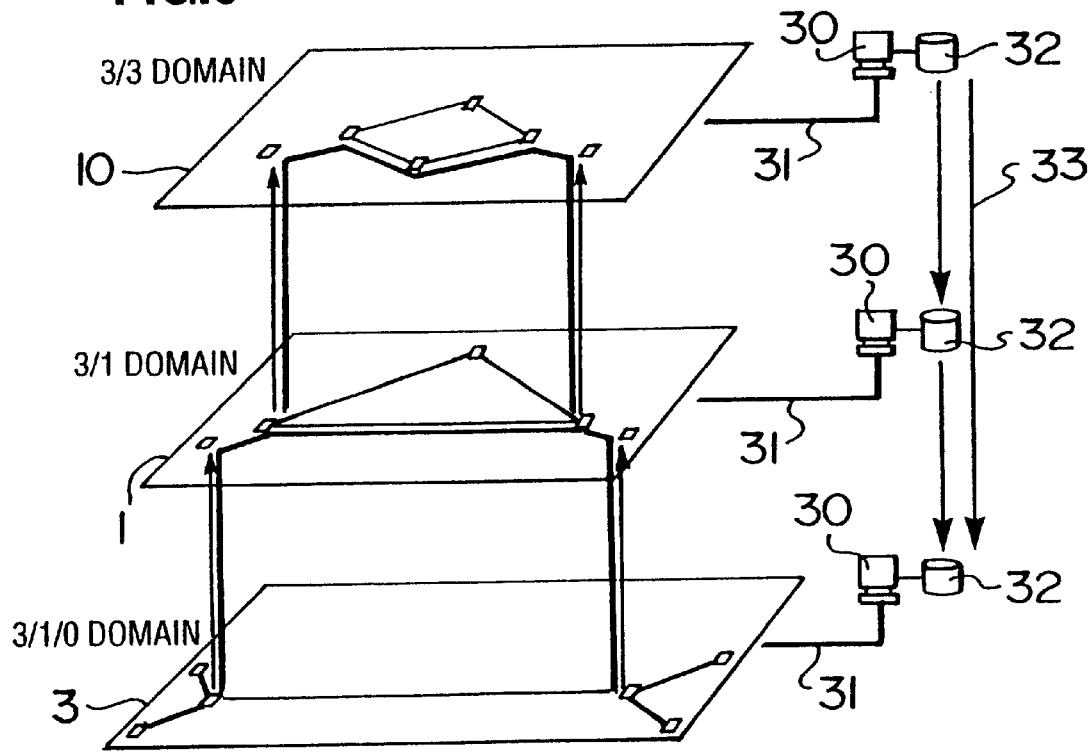
FIG. 7 shows Multiple 46020 Hierarchical Management.

Alternatively, the integrated management of the different technology domains can be achieved using multiple 46020s 30, (i.e., one for each of the SONET, 3/3, 3/1, asynchronous, and Newbridge networks) connected to the respective domains via links 31. This is shown in FIG. 7. In this mode, information is shared via links 33 between the 46020s to correlate the state of services in one network which provide transport facilities in another.

For scalability and/or administrative purposes, where there may be multiple networks of the same technology domain, each managed by a dedicated 46020 network manager. Service provisioning across multiple networks of the same technology domain is achieved using the concept of Multi-Network Service Management.

Figure 8:
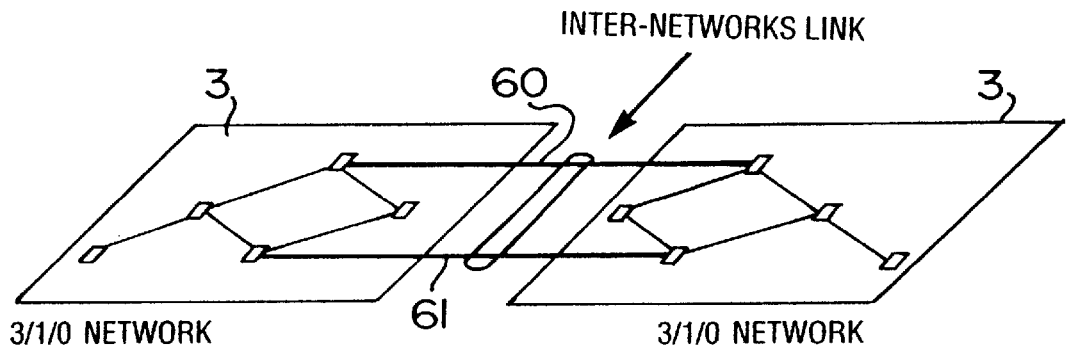
FIG. 8 shows Multiple 3/1/0 Networks.

An example of inter-connected 3/1/0 networks is shown in FIG. 8.

Figure 9:
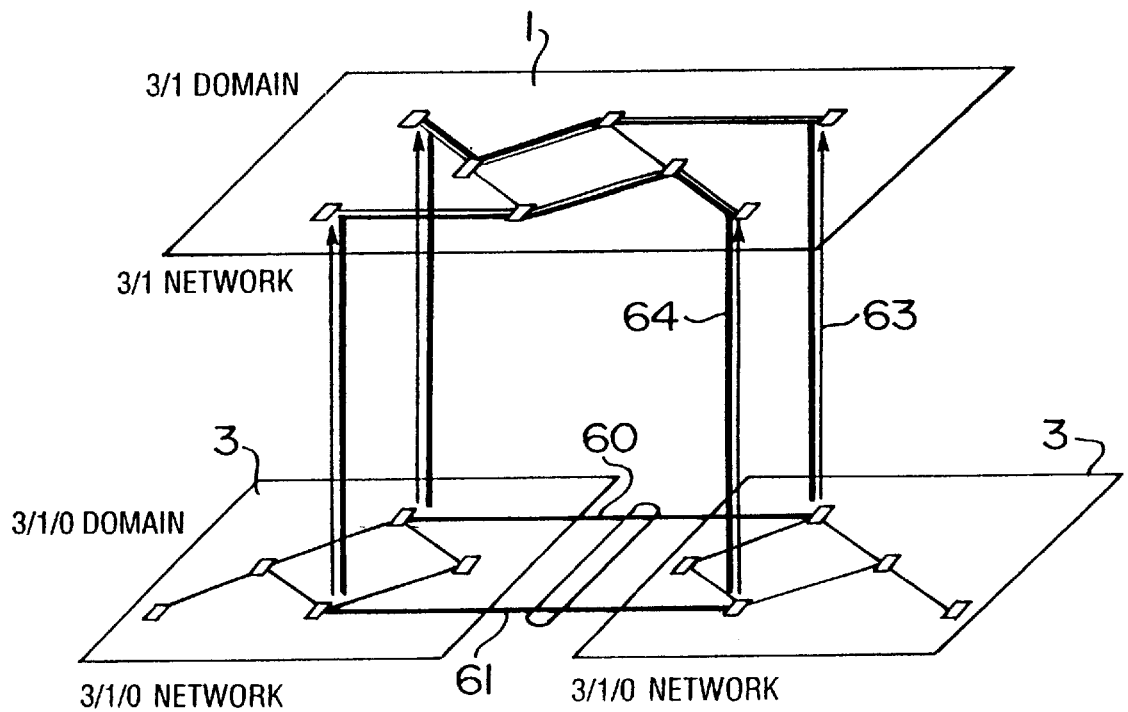
FIG. 9 shows 3/1 Transport for Multiple 3/1/0 Networks.

The inter-network links (i.e., DS1 links) between the 3/1/0 networks are routed through a 3/1 domain network (as DS1 Pass-Through Links), as shown in FIG. 9. The internetwork pass-through links 60, 61 are routed through the 3/1 domain 1 as DS1 paths 63, 64.

Figure 10:
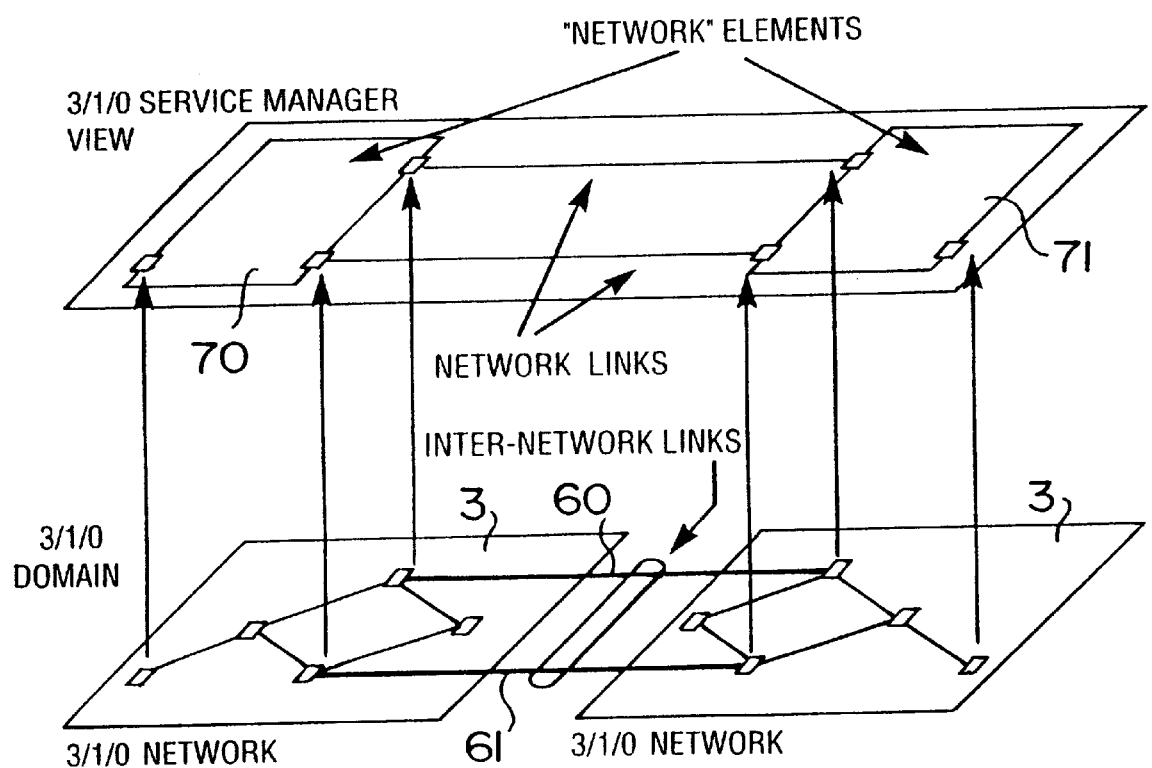
FIG. 10 shows Multiple 3/1/0 NetworksService Management View.

From the perspective of the Multi-Network Service Manager for the 3/1/0 domain 3, the networks may be represented as "network" elements which are inter-connected by network links. The path-ends of a network (which are located on many different network elements in the network) are viewed as path-ends on the network element representing the network. The inter-network links appear as links between the network elements 70, 71 in this service management view (see FIG. 10).

Figure 11:
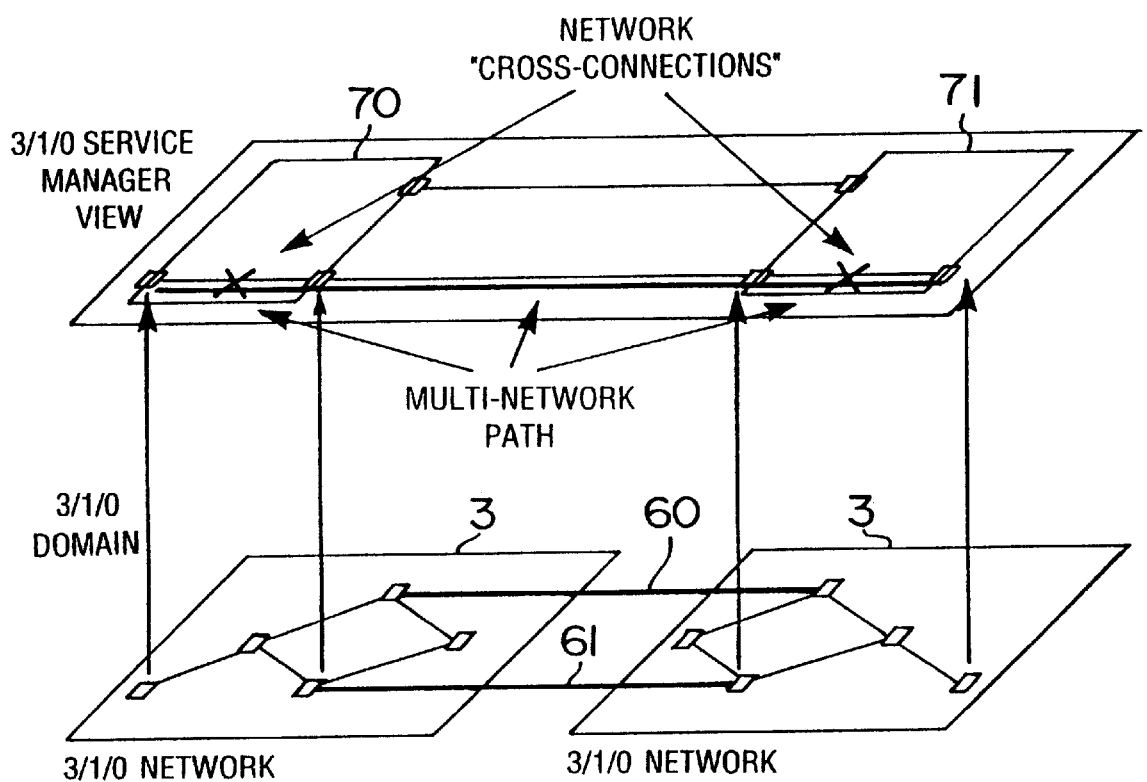
FIG. 11 shows Multiple 3/1/0 Network Path Routing.

Service provisioning across networks is performed from the Multi-Network Service Management view. This is shown in FIG. 11, where the "network" elements are represented as nodes through which "cross-connections" are chosen in the path route.

Figure 12:
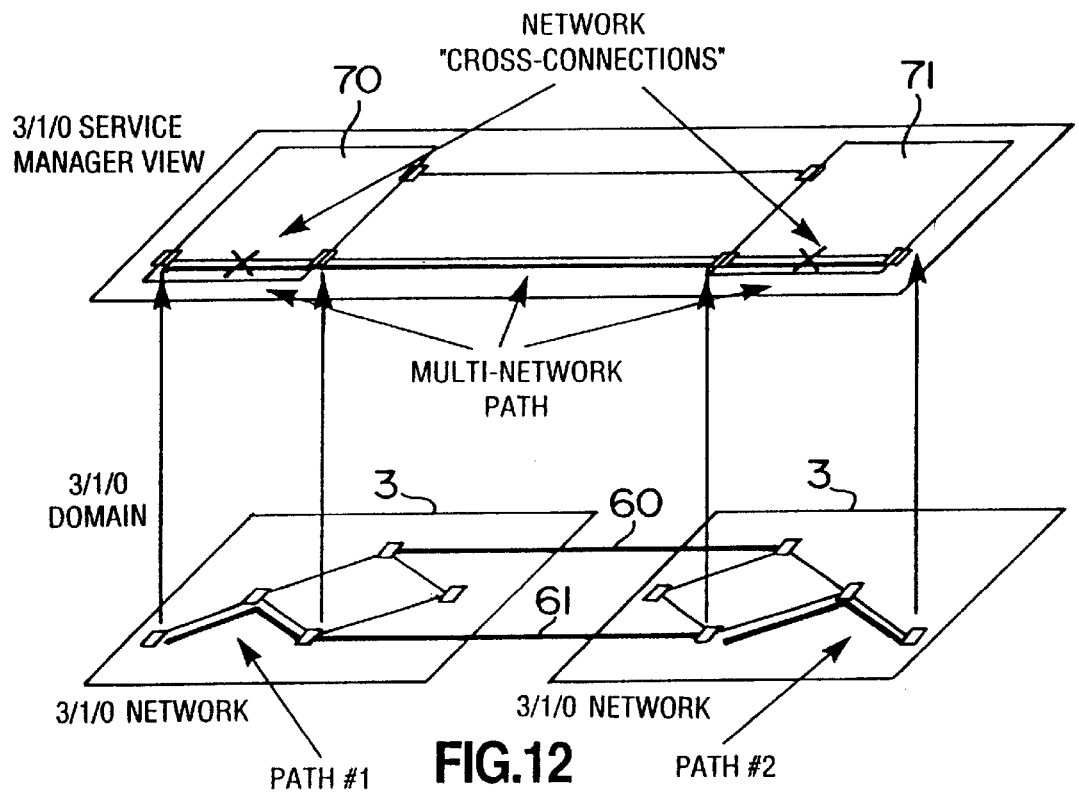
FIG. 12 shows Multiple 3/1/0 Network Path Segments.

These cross-connection commands are sent to the 4602 network managers that manage the individual networks as "path" requests between the path-ends of the networks to the timeslots of the terminating ports of the inter-network links, as shown in FIG. 12.

The route chosen for the multi-network path is based on.
the costs of the inter-network links (assigned values in the Multi-Network Service Manager database)
the fixed costs for establishing cross-connections (paths) through the individual networks—the costs are assigned values in the Multi-Network Service Manager database The mechanisms for route selection, prioritized service recovery using dynamic automatic alternate re-routing (AAR) when a failure in the network affects services, and service recovery when network repairs are based on existing 46020 bandwidth allocation functionality.

Figure 13:
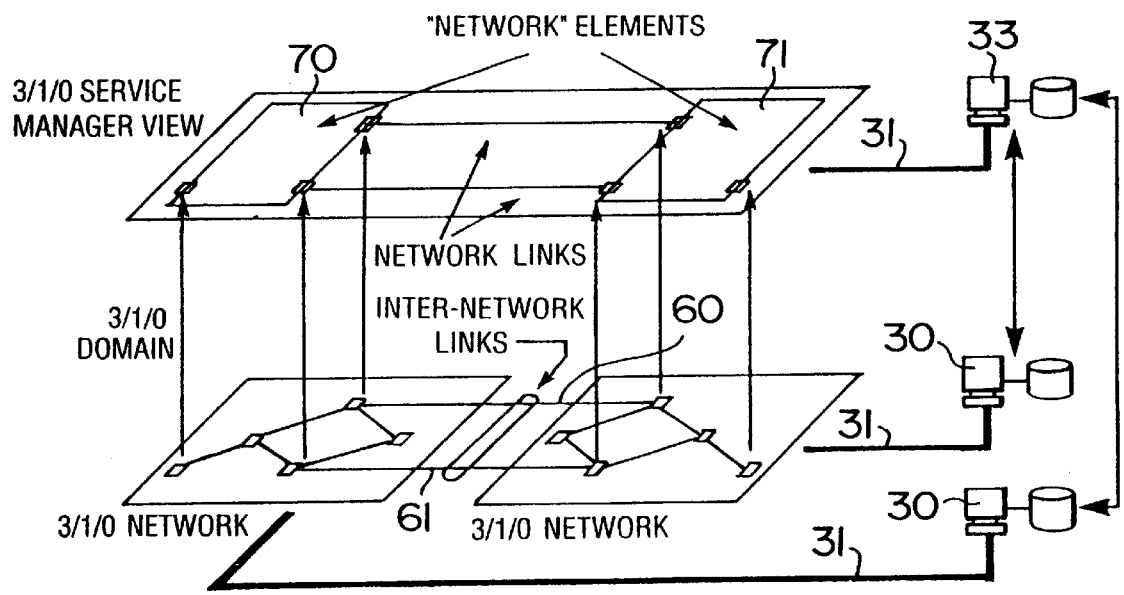
FIG. 13 shows Multiple 3/1/0 Network Management.

From a management perspective, the 46020-based Multi-Network Service Manager 33 is a separate from the individual 46020s 30 which control the individual 3/1/0 networks as shown in FIG. 13.

The Multi-Network Service Manager can manage multiple networks of the same technology domain to provide the same routing capability for multiple 3/1 networks, 3/3 networks, SONET networks, etc.

The combination of the 46020 Hierarchical Pass-Through Routing and Multi-Network Service Management concepts in the following architecture provides integrated management of multiple networks of different technology domains.

Figure 14:
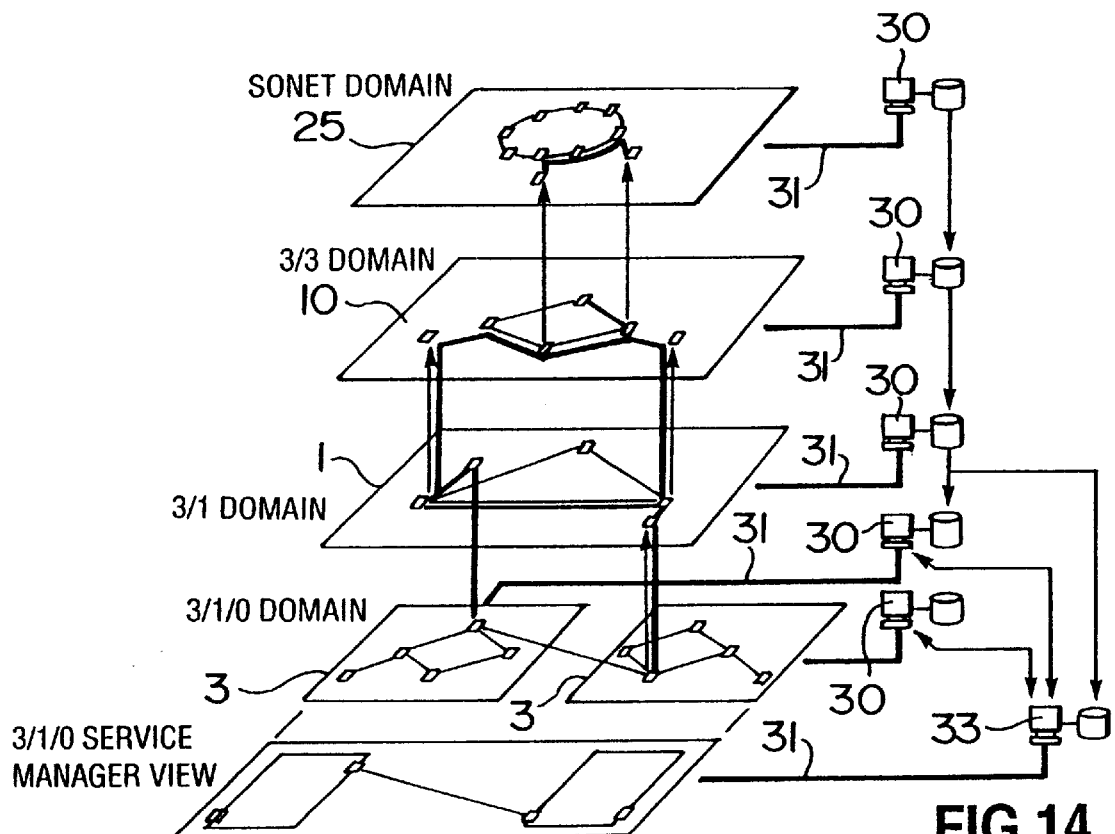
FIG. 14 shows Hierarchical and Multiple 3/1/0 Network Management.
Figure 15:
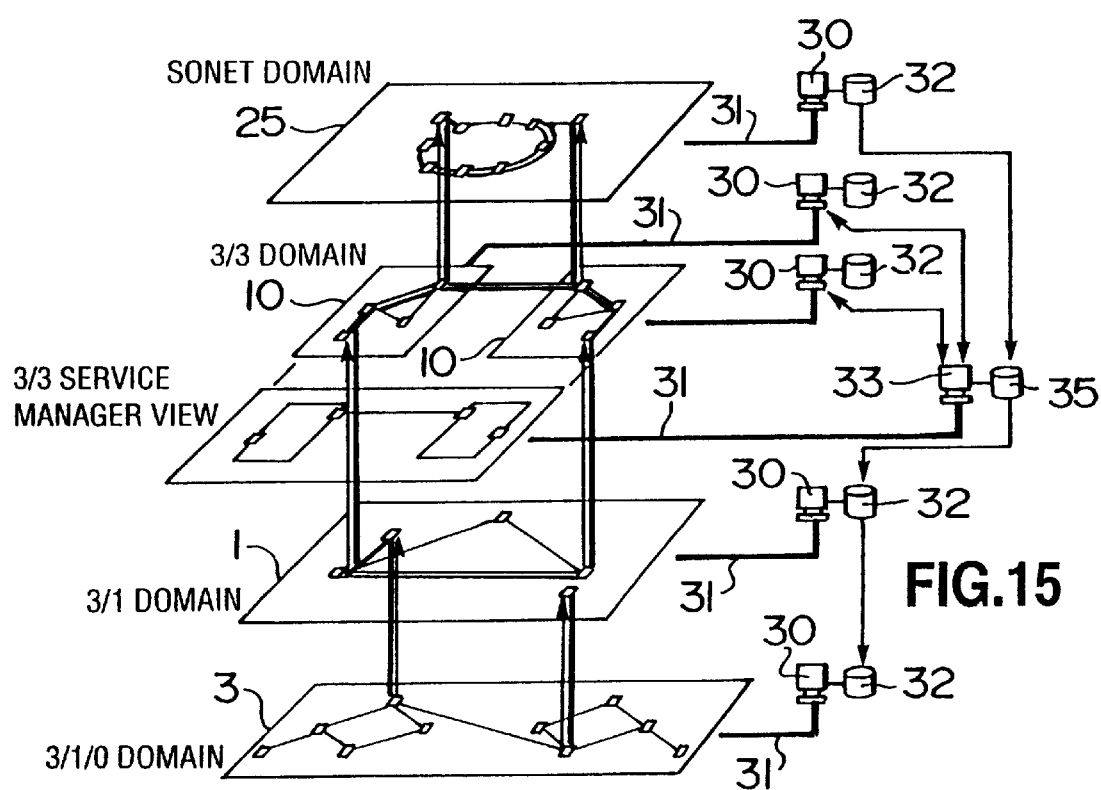
FIG. 15 shows Hierarchical and Multiple 3/3 Network Management.

FIG. 14 shows an example of a Multi-Network Service Manager 33 managing multiple 3/1/0 networks 3. A Multi-Network Service Manager is used at each technology domain wherever management of multiple networks is required. An example of a Multi-Network Service Manager 33 managing multiple 3/3 networks is shown in FIG. 15.

Figure 16:
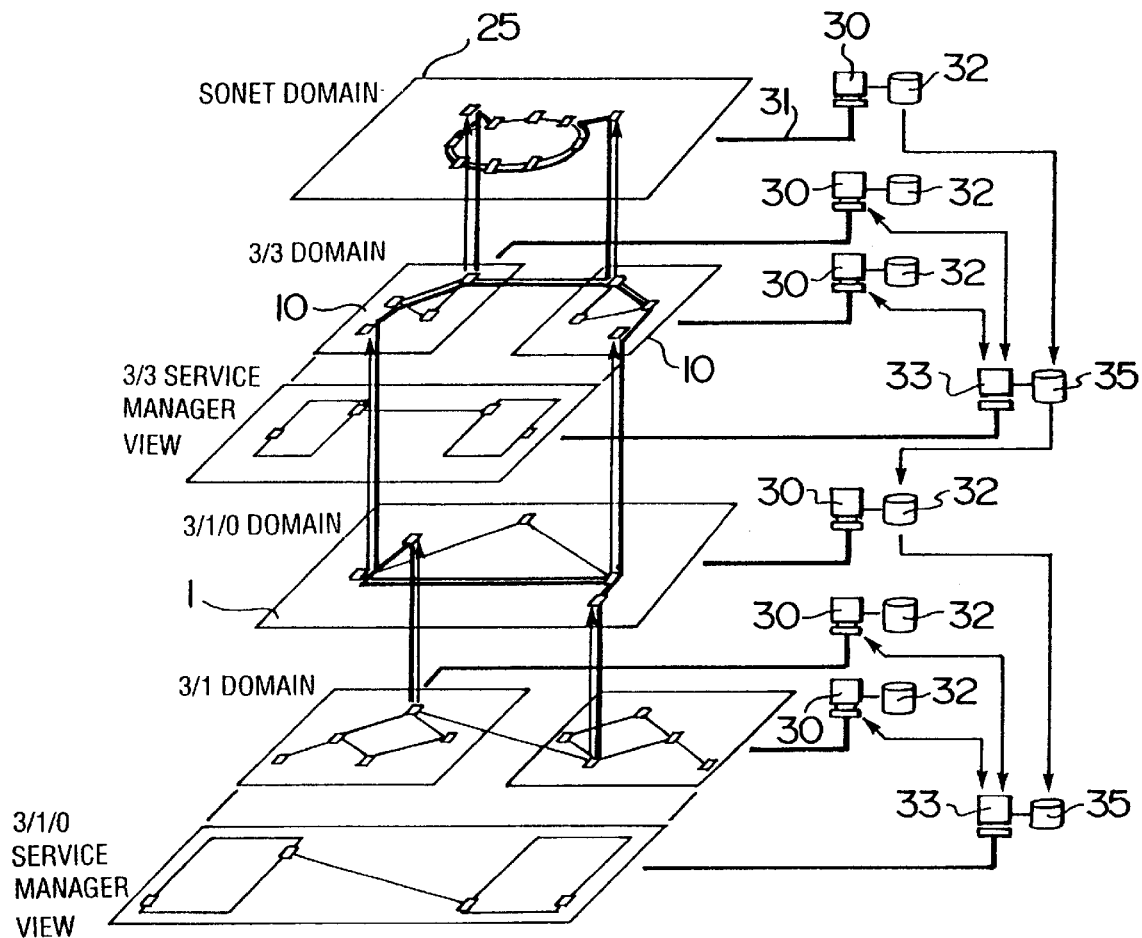
FIG. 16 shows Integrated Hierarchical and Multiple Network Management.

Multi-Network Service Managers 33 for different technology domains may be used in conjunction (i.e., 3/3 and 3/1/0 Multi-Network Service Managers), as shown in FIG. 16.

When Multi-Network Service Managers are used in conjunction with the Hierarchical Pass-Through Routing 4602s in an architecture as described above, the service requests are routed directly to the appropriate 46020 (for services within a network) or to the appropriate Multi-Network Service Manager (for services across domains).

| Glossary | |
| --- | --- |
| AAR | Automatic Adaptive Routing. The term used to describe the dynamic operation of A/B protection switching. |
| ATM | Asynchronous Transfer Mode. |
| BWA | Bandwidth Allocator. Software process that runs on the 4602/46020 that determines the optimum path for a circuit and handles the re-routing of paths in the case of a network failure. |
| DACS | Digital Access and Cross-Connect System. |

-continued

| Glossary | |
|---|---|
| DCS | Digital Cross-Connect System. |
| DS | Digital Signal. Digital facilities that carry 24 (DS1), 96 (DS2), or 672 (DS3) simultaneous voice or voiceband data channels, each operating at 64 kbps (DS0). |
| PTL | Pass-Through Link. |
| PTR | Pass-Through Routing. |
| SONET | Synchronous Optical Network. |
| STS | Synchronous Transport Signal. |
| TDM | Time Division Multiplexing. |
| VT | Virtual Tributary. |

We claim:

1. An integrated network management system for multiple networks of different topologies having a hierarchy of different order bandwidth domains, comprising at least one network manager, wherein said network manager manages the multiple networks and establishes links within a topology domain by implementing hierarchical pass-through routing with a higher order domain in the hierarchy and initiates recovery actions in the event of service failure in a hierarchical manner starting at a said domain with the highest order bandwidth.

2. An integrated network management system as claimed in claim 1, characterized in that a link between nodes in one said topology domain is established as a path routed through a higher order domain.

3. An integrated network management system as claimed in claim 1, characterized in that said higher order domain is a SONET domain.

4. An integrated network management system as claimed in claim 1, characterized in that at least two of said domains have the same order in the hierarchy and are connected together by internetwork links, said internetwork links being provided by paths routed through a higher order domain.

5. An integrated network management system as claimed in claim 1, characterized in that it comprises a plurality of interconnected network managers associated with said respective domains.

6. An integrated network management system as claimed in claim 1, characterized in that it comprises a graphical user interface for showing network topology and network elements.

7. An integrated network management system as claimed in claim 1, characterized in that said network manager implements real-time status monitoring and fault management, and full path (service) management and service recovery capabilities across the multiple networks.

8. A method of managing multiple networks of different topologies having a hierarchy of different order bandwidth domains comprising at least one network manager, wherein links within a topology domain are established by implementing hierarchical pass-through routing with a higher order domain in the hierarchy and that in the event of service failure, recovery action is initiated in a hierarchical manner starting from a said domain with the highest order bandwidth.

9. A method as claimed in claim 8, characterized in that to establish a link between nodes in one said topology domain, a path is routed through a higher order domain.

10. A method as claimed in claim 9, characterized in that said higher order domain is a SONET domain.

* * * * *